United States Patent
Marat et al.

(10) Patent No.: US 9,744,638 B2
(45) Date of Patent: Aug. 29, 2017

(54) METHOD FOR DECOATING A GLASS PANEL

(71) Applicant: LISEC AUSTRIA GMBH, Seitenstetten (AT)

(72) Inventors: Daniel Marat, Amstetten-Greinsfurth (AT); Leopold Mader, Neuhofen/Ybbs (AT)

(73) Assignee: LISEC AUSTRIA GMBH, Seitenstetten (AT)

( * ) Notice: Subject to any disclaimer, the term of this patent is extended or adjusted under 35 U.S.C. 154(b) by 0 days.

(21) Appl. No.: 14/768,039

(22) PCT Filed: Sep. 29, 2014

(86) PCT No.: PCT/AT2014/000177
§ 371 (c)(1),
(2) Date: Aug. 14, 2015

(87) PCT Pub. No.: WO2015/054707
PCT Pub. Date: Apr. 23, 2015

(65) Prior Publication Data
US 2015/0375354 A1  Dec. 31, 2015

(30) Foreign Application Priority Data

Oct. 18, 2013  (AT) .................................. A 804/2013

(51) Int. Cl.
*B24B 7/24*  (2006.01)
*B24B 9/10*  (2006.01)
(Continued)

(52) U.S. Cl.
CPC .............. *B24B 7/241* (2013.01); *B24B 7/242* (2013.01); *B24B 7/245* (2013.01); *B24B 7/247* (2013.01);
(Continued)

(58) Field of Classification Search
CPC  B24B 7/24; B24B 7/242; B24B 7/245; B24B 7/247; B24B 55/02; C03B 33/074; C03C 23/0075
See application file for complete search history.

(56) References Cited

U.S. PATENT DOCUMENTS 4,513,543 A * 4/1985 Lawrenson ............... B24B 1/00
                                                          428/209
4,667,555 A   5/1987 Lisec
(Continued)

FOREIGN PATENT DOCUMENTS

AT        386 595 B    9/1988
AT        403 690 B    4/1998
(Continued)

OTHER PUBLICATIONS

International Search Report, dated Jan. 12, 2015, from corresponding PCT application.
(Continued)

*Primary Examiner* — Timothy V Eley
(74) *Attorney, Agent, or Firm* — Young & Thompson

(57) ABSTRACT

When decoating a glass panel (3), a decoating tool (6) with a circular-cylindrical grinding element (8) is used, which element is set to rotate around its axis. In the end face of the grinding element (8) that is used when the active face (9) is decoated, a hole (10) and at least one radial groove (11) are provided. The decoating tool (6) is placed at a spot (A) on the glass panel (3) in a movement (arrow 13) that is oriented at an acute angle to the plane of the glass panel (3), which lies between the ends (B) and (C) of the strip-shaped decoating area (14) and moves first to the one end (B) (arrow 15) and then to the other end (C) (arrow 16) in order to strip coating from the glass panel (3) in the decoating area (14).

15 Claims, 3 Drawing Sheets

(51) Int. Cl.
*C03B 33/07* (2006.01)
*B24B 53/007* (2006.01)
*C03C 23/00* (2006.01)

(52) U.S. Cl.
CPC .............. *B24B 9/10* (2013.01); *B24B 53/007* (2013.01); *C03B 33/074* (2013.01); *C03C 23/0075* (2013.01); *C03C 2218/328* (2013.01)

(56) References Cited

U.S. PATENT DOCUMENTS

| | | | |
|---|---|---|---|
| 4,920,495 A * | 4/1990 | Pilkington | ............ B26D 3/085 700/167 |
| 5,449,312 A | 9/1995 | Lisec | |
| 5,888,268 A * | 3/1999 | Bando | .................. C03B 33/023 33/1 M |
| 6,341,548 B1 * | 1/2002 | Hirahata | ............... B26F 1/3813 83/699.41 |
| 7,195,224 B2 | 3/2007 | Le | |
| 7,273,406 B2 | 9/2007 | McGlinchy et al. | |
| 7,682,220 B2 * | 3/2010 | Bando | ...................... B24B 9/10 451/11 |
| 7,818,981 B2 * | 10/2010 | Lisec | ...................... B24B 7/242 65/174 |
| 2002/0004355 A1 * | 1/2002 | Bando | .................... B24B 9/102 451/5 |
| 2006/0236840 A1 | 10/2006 | McGlinchy et al. | |
| 2012/0270475 A1 | 10/2012 | Suter et al. | |

FOREIGN PATENT DOCUMENTS

| | | |
|---|---|---|
| AT | 405 724 B | 9/2008 |
| CH | 697 240 B1 | 7/2008 |
| DE | 295 21 396 U1 | 2/1997 |
| EP | 0 192 920 A1 | 9/1986 |
| EP | 0 603 152 A1 | 6/1994 |
| EP | 1 654 200 A1 | 5/2006 |
| EP | 2 386 602 B | 11/2011 |
| EP | 2 486 602 A1 | 8/2012 |
| WO | 2008/107087 A1 | 9/2008 |
| WO | 2010/015357 A1 | 2/2010 |

OTHER PUBLICATIONS

AT Search Report, dated Aug. 1, 2014, from corresponding AT application.
China Office Action dated Aug. 16, 2016, with English Translation; Application No. 201480013479.0.

* cited by examiner

METHOD FOR DECOATING A GLASS PANEL

BACKGROUND OF THE INVENTION

Field of the Invention

The invention relates to a method for treating the surfaces of objects.

Description of the Related Art

The problem frequently arises of treating a flat (plate-like) object on its surface in order to strip from it a surface layer or a coating, in particular by grinding.

For example, when coated glass panels are being processed into insulating glass, it is necessary that the coating be removed (decoated) from the edges of the glass blanks, so that a more secure assembly of insulating glass is possible. Decoating can be done even before glass panels are divided into glass blanks.

Various devices have become known for decoating, i.e., the erosion-treatment of glass panels, in order to remove coatings from the latter in places. By way of example, refer to AT 405 724 B, AT 403 690 B, WO 2008/107087 A, and EP 0 603 152 A.

Glass-cutting tables, on which decoating can also be done, are known in various embodiments, in which connection reference can be made by way of example to AT 386 595 B, EP 0 192 920 B, or EP 1 654 200 B.

The known decoating devices, which can also be combined with a tool (cutting wheel) to score the glass panel, work with grinding wheels ("peripheral wheels"), which act with their periphery on the coating of the glass panel in order to remove the latter.

Methods and devices for decoating are also known from U.S. Pat. No. 7,273,406 B (=US 2006/236840 A), CH 697 240, and EP 2 386 602 B (=US 2012/270475 A).

A decoating tool is known from US 2006/236840 A, which follows at some distance a tool for scoring glass panels, whereby a simultaneous movement of both tools is carried out as soon as a minimum distance between the two tools is reached.

CH 697 240 relates to the setting of a defined pressing force of a grinding tool on a glass disk.

EP 2 486 602 B teaches the decoating of solar modules with a crown-like grinder.

Working with the known devices for treating the surfaces of glass panels, in particular decoating devices, has proven problematic, however, in various cases, for example at the beginning of a treatment process, so that there is a need for an improved method and an improved device for treating, in particular decoating, coated glass panels.

SUMMARY OF THE INVENTION

The object of the invention is to make available a method and a device of the above-mentioned type that are suitable for implementing the method, in particular for decoating glass panels.

This object is achieved according to the invention with a method that has the features of the independent claims that are directed toward the method.

Preferred possible configurations of the method according to the invention are subjects of the subclaims.

Since, with the invention, the tool, e.g., the decoating tool, is not mounted on the end of the (strip-shaped) area, which is to be treated (decoated), but rather is mounted at some distance from the ends thereof and is begun there with the treatment (decoating), the above-mentioned problem no longer arises. With the invention, it is prevented that at the beginning of a treatment process, in particular a decoating process, bad spots, in particular undesirable decoatings, are produced or contaminants remain. Thus, a clean start (to the decoating) in the area where the object is treated, for example the glass panel has been decoated, is produced.

When, according to a preferred embodiment of the method according to the invention, a slanted ("flying") mounting of the tool (grinding tool, decoating tool), i.e., which is not oriented normal to the object (to the glass disk), is performed in a straight or curved path of movement, the advantage results that the tool is placed snugly against the object (the glass panel), since it is applied just slanted, i.e., at an (acute) angle, to the object (the glass panel) and "lands in a grinding-in manner" snugly against the latter.

The procedure according to the invention produces a clean start, in particular the decoating, since the decoating tool is not mounted on one end of the decoating area. The decoating tool is first moved toward one end of the decoating area. Then, on one end of the decoating area, the direction of its movement is changed, and the decoating tool moves toward the other end of the decoating area. Thus, the initial area of the decoating area is covered twice. In addition, the advantage arises that the spot in which the decoating tool is placed does not have to be defined exactly.

Because of the preferred use, according to the invention, of a decoating tool in the form of a cylindrical grinding element ("straight grinder") with a particularly circular active face, i.e., a generally round active face, as the face of the grinding element, which acts on the glass panel in order to remove its coating in a strip-shaped decoating area, a hole that is concentric to the axis of rotation of the grinding tool prevents a convex, projecting area, e.g., a cone-shaped projection, from being produced as the grinding tool wears down in the area of the axis and around the latter, which projection would impair the decoating action.

Further advantages of the straight grinder that is preferably used according to the invention are:

a) The trimming that is typically necessary in the case of grinding wheels (peripheral wheels) is no longer necessary.
b) The operation of peripheral wheels is connected to large forces that act in a parallel or anti-parallel manner to the grinding direction (the grinding wheel moves or brakes), which have to be accommodated by the machine structure. The latter are no longer necessary in the case of a straight grinder.
c) Simpler tool-changing.

In addition, it can be provided within the framework of the invention that at least one groove that is directed (radially) outward from the hole emptying there is provided in the active face of the decoating tool. This groove has the advantage that the grinding tool is cooled and coating material that is stripped by the groove can be removed.

With the invention, it can also be provided that a nozzle is assigned to the grinding tool, from which nozzle a gas stream (air stream) exits and blows away stripped coating material.

In an exemplary embodiment of the method according to the invention, it can be provided that the tool is placed on the object eccentrically to the area that is to be treated, in particular to be decoated, i.e., at a short distance from one end of the area that is to be treated, whereby the tool is preferably first moved toward the end of the area that is to be treated, from which during placement on the object it has a shorter distance than to the other end.

In an exemplary embodiment of the method according to the invention, it can be provided that the tool, during placement on the object, is moved in a direction (arrow 13) that encompasses an acute angle with the plane of the object, whereby the paths of movement of the tool are straight or curved.

In an exemplary embodiment of the method according to the invention, it can be provided that a grinding element of the tool is brought up toward the object without previous determination of the thickness of the object and/or the wear and tear of the grinding element and that the approach is halted as soon as the grinding element touches the object.

In an exemplary embodiment of the method according to the invention, it can be provided that as a tool, a grinding tool with a grinding element is used, whose active face is essentially circular and has a hole that is concentric to its axis of rotation and that empties into the active face.

In an exemplary embodiment of the method according to the invention, it can be provided that as a tool, a grinding tool with a grinding element is used, whose active face has at least one groove.

In an exemplary embodiment of the method according to the invention, it can be provided that the at least one groove is radially oriented relative to the axis of rotation of the grinding element or is some distance from the axis of rotation.

In an exemplary embodiment of the method according to the invention, it can be provided that the groove is reworked or a new groove is produced when the grinding element has been worn down essentially to the bottom of the groove.

In an exemplary embodiment of the method according to the invention, it can be provided that a gas stream, in particular an air stream, is directed toward the tool, in particular the decoating tool, in particular its active face, in order to blow away material that accumulates during stripping, in particular coating material that accumulates during decoating.

In an exemplary embodiment of the method according to the invention, it can be provided that the gas stream is directed at an acute angle toward the glass panel and/or toward the peripheral face of the grinding tool.

In an exemplary embodiment of the method according to the invention, it can be provided that a glass panel is scored in at least one decoated area in order to prepare the division of the glass panel.

In an exemplary embodiment of the method according to the invention, it can be provided that the scoring is done during the decoating of the glass panel.

In an exemplary embodiment of the method according to the invention, it can be provided that the scoring is done after all of the areas that are to be decoated have been decoated.

In an exemplary embodiment of the method according to the invention, it can be provided that the glass panel is scored in the center of at least one decoated area.

In an exemplary embodiment of the method according to the invention, it can be provided that the glass panel is scored eccentrically to the at least one decoated area.

In an exemplary embodiment of a device that can be used for implementing the method according to the invention, the tool comprises a grinding element, in whose face that is designed as an active face a hole empties in the center.

In an exemplary embodiment of a device that can be used for implementing the method according to the invention, the grinding element can be essentially (circular-) cylindrical and the active face can be an end face of the grinding element.

In an exemplary embodiment of a device that can be used for implementing the method according to the invention, at least one groove that is open toward the active face can be provided in the active face of the grinding element.

In an exemplary embodiment of a device that can be used for implementing the method according to the invention, the groove can be radially oriented relative to an axis of rotation of the grinding element or can be some distance from the axis of rotation.

In an exemplary embodiment of a device that can be used for implementing the method according to the invention, a nozzle that is loaded with compressed gas can be provided, which nozzle empties adjacent to the decoating tool.

In an exemplary embodiment of a device that can be used for implementing the method according to the invention, the tool, in particular a decoating tool, and a tool for scoring the glass panels can be arranged on processing heads that are independent of one another.

In an exemplary embodiment of a device that can be used for implementing the method according to the invention, the tool, in particular a decoating tool, and a tool for scoring the glass panel can be arranged on a common processing head and can be actuated independently of one another.

In an exemplary embodiment of a device that can be used for implementing the method according to the invention, at least one groove that is open toward the peripheral face and that ends in the end face can be provided in the peripheral face of the grinding element.

In an exemplary embodiment of a device that can be used for implementing the method according to the invention, the groove can be oriented parallel to the axis or curved in the shape of a helix.

In an exemplary embodiment of a device that can be used for implementing the method according to the invention, a stripping tool, in particular a saw blade, can be provided for producing and/or reworking grooves, whereby a relative movement is produced between the stripping tool and grinding element.

BRIEF DESCRIPTION OF THE DRAWING FIGURES

Further details and features as well as advantages of the method according to the invention follow from the description below of a decoating as a preferred embodiment based on the drawings. Here:

DETAILED DESCRIPTION OF THE INVENTION

Figure 1:
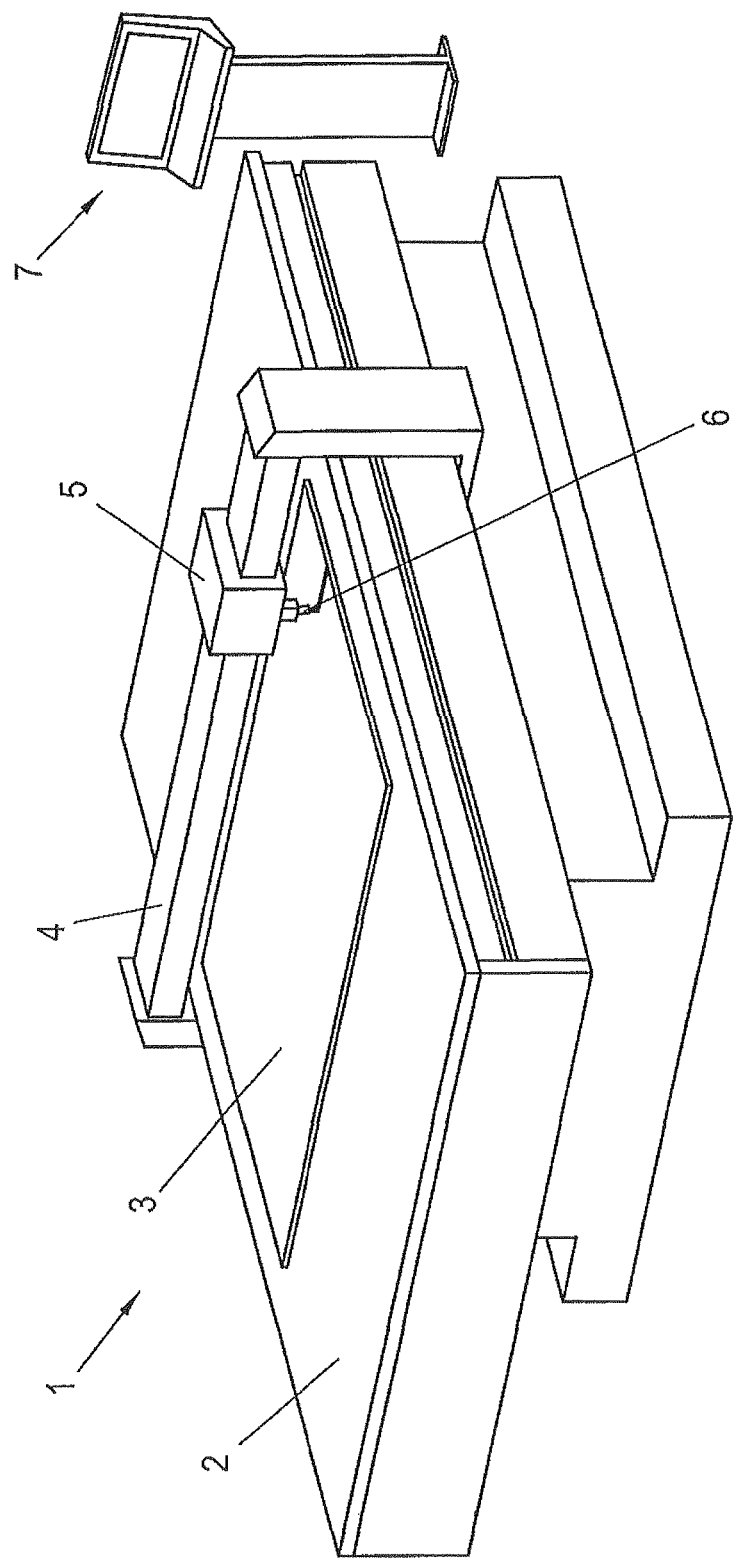
FIG. 1 shows a device for decoating and scoring a glass panel in oblique view.

A device 1 that is shown in FIG. 1 is designed like a glass-cutting table and has a support surface 2 (table) that is designed as an air-cushion bed for a glass panel 3 that is to be treated. A bridge 4 that can be guided to move on the side edges of the support surface 2 is assigned to the support surface 2. On the bridge 4, a sled 5 that can be moved along the bridge 4 is provided.

Drives are provided both for moving the bridge 4 along the support surface 2 and for moving the sled 5 along the bridge 4.

By moving the bridge 4, on the one hand, and/or the sled 5 with a processing head comprising a decoating tool 6, on the other hand, any (straight/curved) paths, for example corresponding to the provided division pattern of the glass panel 3, can be pulled away.

For operating and controlling the device 1, a control and operating console 7 is provided.

The processing head that is provided on the sled 5 has the decoating tool 6 as an essential component, which tool can be raised and lowered by a drive crosswise to the plane of the support surface 2. A rotary drive is assigned to the decoating tool 6, which is designed in the example as a grinding tool with a grinding element 8 (FIG. 2) in order to put the grinding element 8 in rotation around its axis when the grinding tool is used to strip a coating from a glass panel 3.

In a preferred embodiment, the processing head also has a tool for scoring the glass panel 3, so that after the decoating corresponding to the desired division pattern of the glass panel 3, the glass panel 3 in the area of the strips in which the coating has been stripped ("decoating areas") is scored so that the glass panel 3 can then be divided (broken) into blanks.

The tool for scoring the glass panel 3 can also be provided on a processing head, which is arranged on a sled that is separate from the sled 5.

Figure 2:
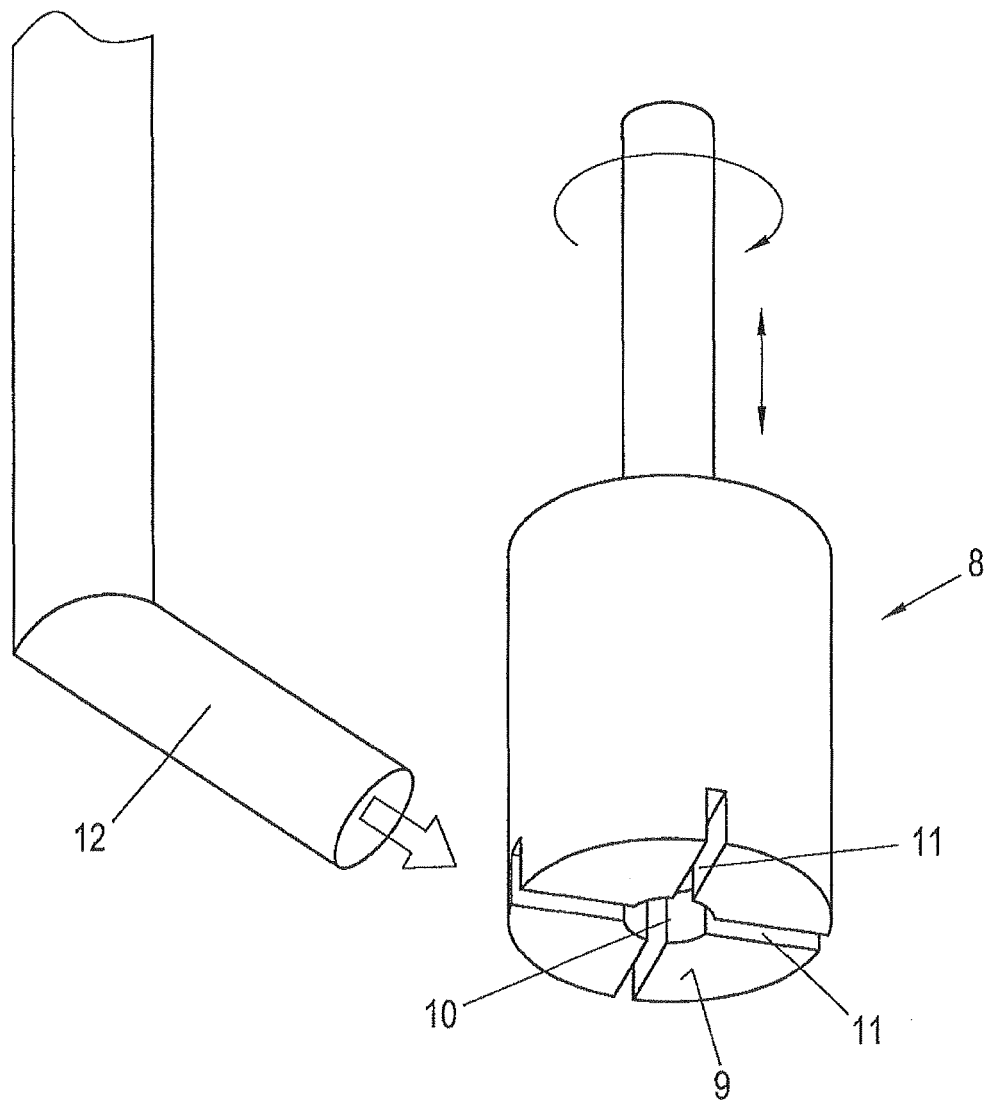
FIG. 2 shows a decoating tool in oblique view.

The grinding tool that can preferably be used within the framework of the invention is diagrammatically depicted in an embodiment in FIG. 2. It has a (circular-)cylindrical grinding element 8 with an active face 9, which is placed on the glass panel 3 for decoating.

A hole 10 (blind hole) empties into the center of the active face 9 of the grinding element 8, i.e., concentric to its axis of rotation. The hole 10 prevents a convex (cone-shaped) area from being formed in the area around the axis of rotation during the wear and tear of the grinding element 8 (the wear and tear of its end face that serves as an active face 9).

In addition, four grooves 11 are provided in the active face 9 of the grinding element 8 in the embodiment that is shown, which grooves extend from the center hole 10 to the peripheral face of the grinding element 8. The number of grooves 11 is insignificant; one, two, three, four as shown, or even more grooves 11 can be provided. The grooves 11 can also be of different depths.

The center planes of the grooves 11 preferably, but not necessarily, go through the axis of the grinding element 8.

The grooves 11 can also be formed by axis-parallel grooves, which are open toward the side face of the grinding element 8 and end in its active face.

The grinding element 8 can consist of an elastic material (polymer), in which abrasive material ($SiC$, $Al_2O_3$) is embedded.

In FIG. 2, it is shown that a nozzle 12 is assigned to the grinding element 8 of the grinding tool, which nozzle is loaded with compressed gas (compressed air) in order to blow away stripped coating material.

The air stream has the additional advantage that the separating agent powder that is usually provided between glass panels and that can be still be found on the surface of the disk after support on the cutting table is blown away from the operating area of the grinding element 8. The separating agent powder could have been cooled by grinding heat and thus could form undesirable residue. Also, other dirt particles are removed. Another effect of the air stream: it cools during decoating.

Figure 3:
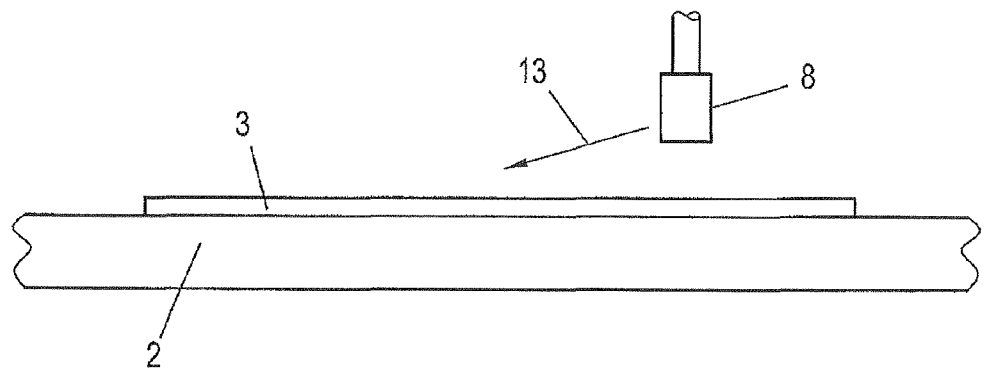
FIG. 3 shows diagrammatically the mounting of the decoating tool.

When implementing the method according to the invention with use of the described device, the procedure is as follows, for example:

After a glass panel 3 has been placed on the support surface 2 of the device 1 and has been oriented—using activatable contacts—the grinding tool of the decoating tool 6 is mounted in a "flying" manner with its grinding element 8 in a straight or curved movement that is oriented at an acute angle to the plane of the glass panel (arrow 13 in FIG. 3) and thus lands in a grinding-in manner snugly against the coating of the glass panel 3.

In this case, the grinding element 8 is applied to the item "on contact," so that it is not necessary to determine the thickness of the glass panel 3 and/or the wear and tear of the grinding element 8 or to control the application of the grinding element 8 corresponding to the determined glass thickness and/or the wear and tear of the grinding element 8. "On contact" means: moving the end face of the grinding element 8 up to the surface that is to be treated (ground) and stressing the grinding element 8 against the surface with a predetermined force.

Figure 4:
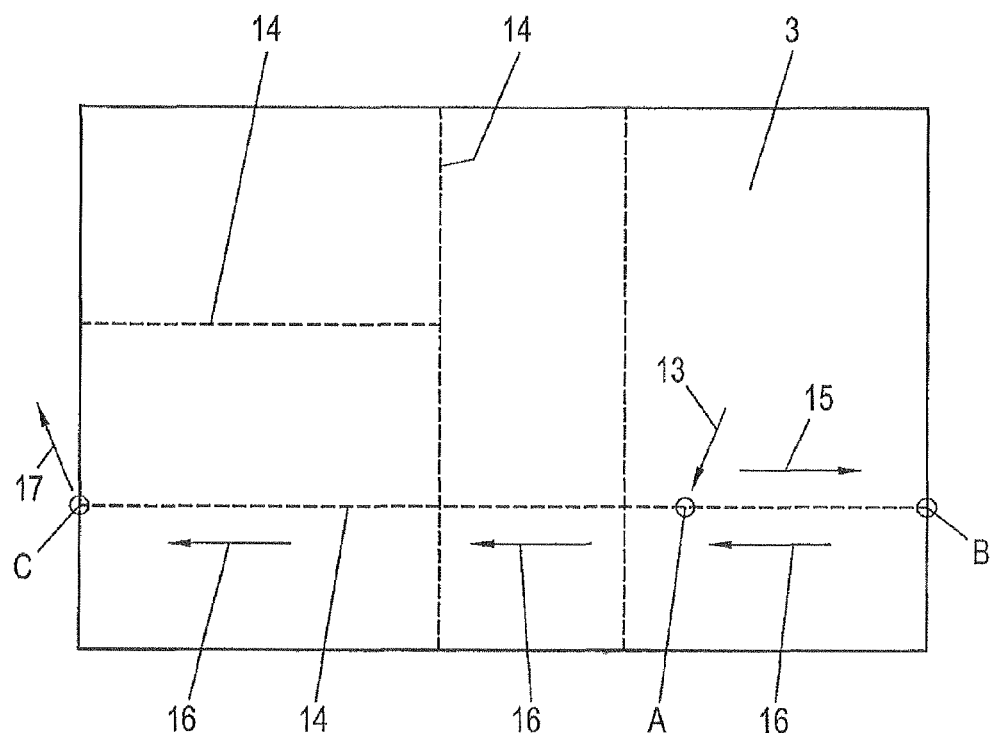
FIG. 4 shows diagrammatically the course of a decoating process.

It is further provided (cf. FIG. 4) that Item A, in which the grinding element 8 strikes the glass panel 3 or its coating, does not lie on the end of an area 14 (indicated in broken lines in FIG. 4), which is to be decoated, but rather at some distance from the ends B and C of the area 14. Then, the grinding tool is moved with its grinding element 8 by moving the bridge 4 and/or the sled 5, which holds the processing head with the decoating tool 6, in the one end B of the area 14 in which it is to be decoated (arrow 15), and then after reversal of the direction of movement (arrows 16) is moved from the end B to the other end C of the strip-shaped area 14 while coating is stripped. Stripped coating material is blown away by the air stream that exits from the nozzle 12. As soon as the end C of the area 14 is reached, the grinding tool is lifted from the glass disk 3 (arrow 17). Then, additional areas 14, as described above, can be decoated. The movements of the processing head with the decoating tool 6 correspond to the desired division pattern (the latter is indicated in broken lines in FIG. 4 by way of example), after which the glass panel 3 is to be scored and is to be divided into blanks after the areas 14 have been decoated corresponding to the division pattern. The score lines can lie in the center of decoated areas or eccentrically to the latter.

When the grooves 11 in the active face 9 of the grinding element 8 have become too flat because of the wear and tear of the grinding element 8, the grooves can be reworked (expanded in depth). To this end, for example, in an area of the support surface 2 of the device 1, a system for reworking can be provided, which is equipped, for example, with a tool like a circular saw blade. Instead of reworking a groove 11, there is the option of cutting a new groove 11 in the active face 9 of the grinding element 8.

In summary, an embodiment of the invention can be described as follows:

When decoating a glass panel 3, a decoating tool 6 with a circular-cylindrical grinding element 8 is used, which element is set to rotate around its axis. In the end face of the grinding element 8 that is used when the active face 9 is decoated, a hole 10 and at least one radial groove 11 are provided. The decoating tool 6 is placed at a spot A on the glass panel 3 in a movement (arrow 13) that is oriented at an acute angle to the plane of the glass panel 3, which lies between the ends B and C of the strip-shaped decoating area 14 and moves first to the one end B (arrow 15) and then to the other end C (arrow 16) in order to strip coating from the glass panel 3 in the decoating area 14.

The invention claimed is:

1. A method for decoating a glass panel, comprising:
    placing a decoating tool on a surface of the glass panel at a spot that is offset from ends of the glass panel inside an area of the glass panel that is to be decoated, so that the decoating tool does not lie at an end of the area of the glass panel that is to be decoated;
    moving the decoating tool up to a first end of the ends of the glass panel; and then
    moving the decoating tool in an opposite movement relative to the glass panel up to a second end of the ends of the glass panel, so that an initial area of the glass panel that is to be decoated is covered twice, wherein the decoating tool comprises a grinding element with a generally round active face that is concentric to an axis of rotation that passes through a center hole in the active face.

2. The method according to claim 1, wherein the decoating tool is moved during placement on the surface of the glass panel in a direction that encompasses an acute angle with the surface of the glass panel, whereby paths of movement of the decoating tool are straight or curved.

3. The method according to claim 2, wherein the active face has at least one groove.

4. The method according to claim 2, further comprising directing a gas stream toward the active face of the decoating tool, in order to blow away coating material that accumulates during decoating.

5. The method according to claim 2, wherein the glass panel is scored in at least one decoated area in order to prepare for division of the glass panel.

6. The method according to claim 2, wherein the glass panel is scored in a center of the at least one decoated area.

7. The method according to claim 1, wherein the active face has at least one groove.

8. The method according to claim 1, further comprising directing a gas stream toward the active face of the decoating tool, in order to blow away coating material that accumulates during decoating.

9. The method according to claim 1, wherein the glass panel is scored in at least one decoated area in order to prepare for a division of the glass panel.

10. The method according to claim 9, wherein the glass panel is scored in a center of the at least one decoated area.

11. The method according to claim 1, wherein the center hole is a blind hole.

12. The method according to claim 1, wherein the center hole prevents a convex area being formed in the active face.

13. The method according to claim 1, wherein there are four grooves in the active face, each groove extending from the center hole to a periphery of the active face.

14. The method according to claim 1, wherein the grinding element is formed from polymer in which abrasive material is embedded.

15. The method according to claim 14, wherein the abrasive material is SiC or $Al_2O_3$.

* * * * *